United States Patent

Kosziech et al.

[15] 3,697,024

[45] Oct. 10, 1972

[54] ROTOR MAST SUPPORT FOR HELICOPTERS

[72] Inventors: Karl-Heinz Kosziech, Friedrichshafen; Kurt Teschner, Immenstaad, both of Germany

[73] Assignee: Dornier A.G., Friedrichshafen/Bodensee, Germany

[22] Filed: Jan. 21, 1971

[21] Appl. No.: 108,295

[30] Foreign Application Priority Data

Feb. 26, 1970    Germany..........P 20 08 977.4

[52] U.S. Cl. ................248/15, 244/17.27, 416/500
[51] Int. Cl. ..........................B64c 27/04, F16f 15/10
[58] Field of Search .....248/15, 358, 184; 244/17.27, 244/17.25; 416/140, 500; 267/154; 188/1 B; 74/574

[56] References Cited

UNITED STATES PATENTS

| | | |
|---|---|---|
| 2,970,367 | 2/1961 | Crump...................416/500 X |
| 3,118,504 | 1/1964 | Cresap.................244/17.27 X |
| 3,378,083 | 4/1968 | Lichten et al..........416/140 X |
| 3,502,290 | 3/1970 | Legrand et al......244/17.27 X |
| 3,508,841 | 4/1970 | Derschmidt...........416/140 X |
| 3,514,054 | 5/1970 | Mard et al..............244/17.27 |

*Primary Examiner*—J. Franklin Foss
*Attorney*—James E. Bryan

[57] ABSTRACT

This invention relates to a movable rotor mast support for helicopters adapted to be mounted between the rotor mast and the airframe comprising a universal joint including gimbal ring means and journal means, said gimbal ring means including lateral cantilever means having journal means therein, said latter journal means being extended to form a torsion spring rod, and rotation-preventing means connecting the end of the torsion spring rod with said cantilever means.

5 Claims, 3 Drawing Figures

INVENTORS
KARL-HEINZ KOSZIECH
KURT TESCHNER

BY James E. Bryan
ATTORNEY

ROTOR MAST SUPPORT FOR HELICOPTERS

The present invention relates to a movable rotor mast or pylon support or positioning for helicopters. It is mounted between the helicopter airframe and the rotor mast and has the purpose of keeping any superimposed vibrations of the rotor away from the airframe.

The rotor mast is customarily connected with the airframe as a firm constituent thereof and serves for receiving the rotor head with the rotor blades adjacent thereto. Since the rotor blades are subjected to a continuous change of the rotor blade angle of pitch, vibrations will quite obviously take place and are transmitted via the rotor mast to the rigidly connected airframe.

It would be conceivable to mount elastic intermediate members, such as rubber-metal blocks, as a remedy, between the rotor mast and the airframe. While these members would eliminate the undesirable vibrations from the airframe, they have at the same time the disadvantage that the rotor mast is movable in all three coordinate directions. But specifically in the axial direction of the rotor mast, a displaceability is unfavorable since the rotor blade angle displacement is influenced thereby.

A particular problem arises in connection with shaft-driven helicopters. The power transmission shaft does not allow for any mobility for structural reasons so that one is actually forced to simply support the entire drive aggregate, together with the gear system and drive shafts, at the airframe in an elastic manner. Since greater masses must be moved in this case, the vibration damping is not very successful. Separate gear means at the power transmission shaft which render possible a movement with smaller masses, thus effectively increasing the damping, are difficult to realize for reasons pertaining to weight. The same problem arises, however, also in helicopters which are driven according to the reaction principle. While the masses to be moved are smaller in that case because mechanical power transmission elements and gear units are lacking, flexible pipe lines for the driving medium are necessary instead and must be provided through the rotor mast. This means that the rotor mast must be made with greater dimensions so that the pipe lines do not undergo a cross-sectional reduction.

Based on and starting with this state of the art, the present invention provides a rotor mast support or positioning which allows for a simple movement in the radial plane of the rotor mast while excluding, on the other hand, an axial movement thereof. It is moreover intended to provide an effective mechanism or device which keeps the rotor mast in a central position and rapidly damps again any vibrations as they may arise. Furthermore, the damping device is intended to be mounted in proximity to the support in a light-weight and space-saving fashion.

This is achieved, in accordance with the present invention, by virtue of the fact that a universal joint consisting of a gimbal ring and a journal is mounted at the rotor mast; that the gimbal ring comprises a lateral cantilever or arm in which a journal being positioned therein is successively constructed as a torsion spring rod whose end is rigidly secured to the cantilever by means of a rotation-preventing means. In order to render it possible to attain a spring action also in the axle which is positioned transversely to the torsion spring rod, it is proposed, according to a further embodiment of the present invention, that the cantilever be embedded at the end in a transversely positioned set of leaf-type springs.

Any movement pointing in the radial direction of the rotor mast is rendered possible by virtue of this arrangement of a spring mechanism and damping device in conjunction with a universal joint for the support or positioning of the rotor mast at the airframe. A movement in the axial direction of the rotor mast, on the other hand, is effectively avoided. Furthermore, it is thus rendered possible to damp the arising vibrations. The vibrations caused by the rotor are kept away from the airframe.

The present invention will now be further described hereinafter on the basis of one embodiment thereof taken in connection with the accompanying drawing, wherein FIG. 1 is a cross-sectional view through a rotor mast support or positioning in accordance with the present invention;

Figure 1:
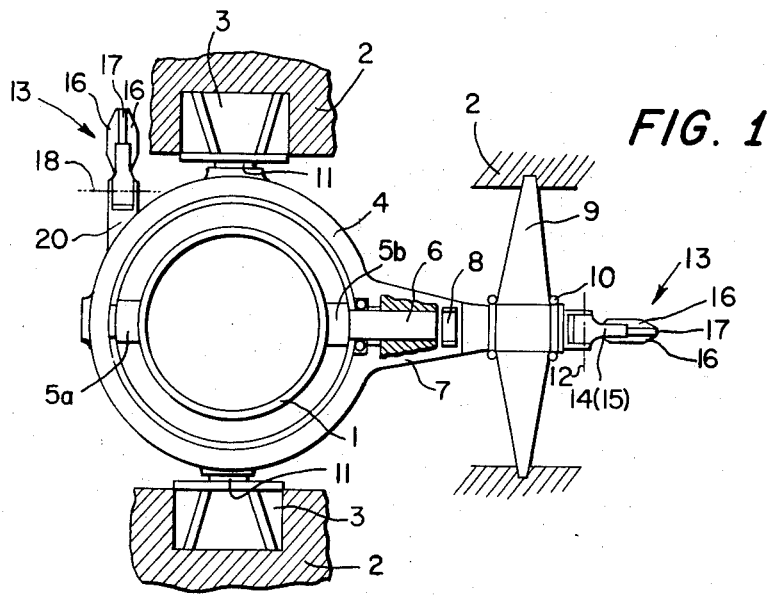

As is apparent from the drawing, FIG. 1 is a cross-sectional view of a rotor mast support or positioning. Shown therein is a rotor mast support for a two-bladed rotor helicopter with blade tip drive. Since the same problems arise also in a shaft-driven rotor, the arrangement may be used for both types of drive systems. The difference lies primarily in the dimensioning of the rotor mast.

In the center, the rotor mast 1 is represented as a pipe. The airframe 2 has been shown shaded and receives the bearing blocks 3. Mounted at the rotor mast 1 is a gimbal ring 4 which is secured at the rotor mast with the aid of two journals 5a and 5b which latter are provided so as to be offset about 180° with respect to each other. The journal 5a is rotatably positioned at the gimbal ring 4. The other journal 5b is connected with a torsion spring rod 6 in a manner such as to be rigid or fixed against rotation in the axial extension thereof. Flanged to the gimbal ring 4 is a cantilever or arm 7 provided as a hollow body, whose end comprises a gear-tooth system 8, for example an internal involute toothing. The torsion spring rod 6 has at the end thereof the required counter toothing and is therewith connected with the gimbal ring 4 so as to be rigid against rotation. Also provided in the extension of the torsion spring rod 6 behind the gear-tooth system 8 at the cantilever 7 is a bearing surface serving for the attachment of a set of springs 9. The latter consists of several trapezoidally provided single spring leaves which are secured to the cantilever 7 by means of the spring brackets 10. The gimbal ring 4 is provided at the outside thereof with journals 11 which are equally offset about 180° with respect to each other and are rotatably guided within the bearing blocks 3. The axis of the journals 11 is perpendicular to the axis of the journals 5a and 5b and is positioned in the same plane. Arranged at the end of the cantilever 7 is a fork joining or link joint 12 which serves as a hinge or pivot point for a friction lining damper 13. The friction lining damper 13 consists of two friction discs 16 to which the lever arms 14 and 15 are secured. Inserted between the two friction discs 16 is a friction lining 17. The lower lever arm 15 is connected to another fork joining or link joint 12 at the airframe 2.

Laterally mounted at the gimbal ring 4 approximately parallel with respect to the journals 11 is an arm 20 to which a friction lining damper 13 is secured, as described above. The friction lining dampers 13 are arranged at a right angle with respect to each other. Other types of vibration dampers, of course, may be employed. It would be conceivable, for example, to utilize a hydraulic vibration damper or the like which is more favorable in its effect, but structurally more expensive elements are precisely intended to be avoided.

Figure 2:
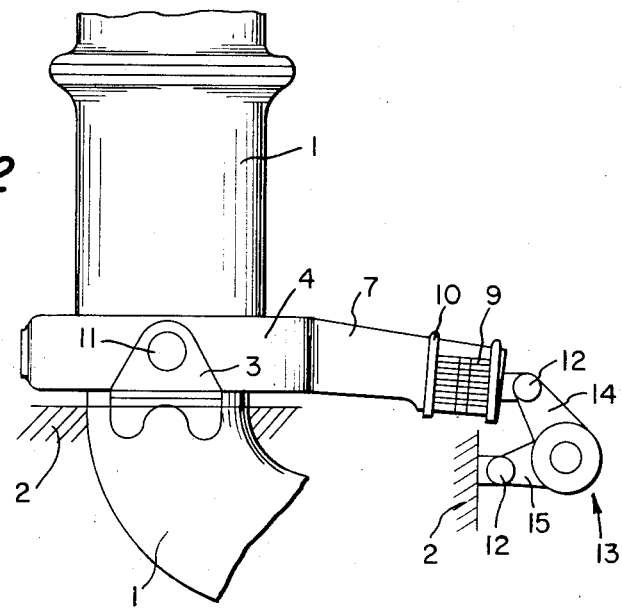
FIG. 2 is a view in elevation of the device of FIG. 1.

FIG. 2 is a view in elevation of the rotor mast support or positioning. The rotor mast 1 has a straight configuration at the upper side of the universal joint whereas the lower side thereof is provided with a pipe elbow. This particular construction of the rotor mast is proposed for helicopters with blade tip drive. In case of the use of a shaft-driven rotor drive, the shaft extends through a straight pipe representing the rotor mast 1. The position of the various structural elements, such as the friction lining damper 13 and the set of leaf-type springs 9, is apparent from the Figure.

Figure 3:
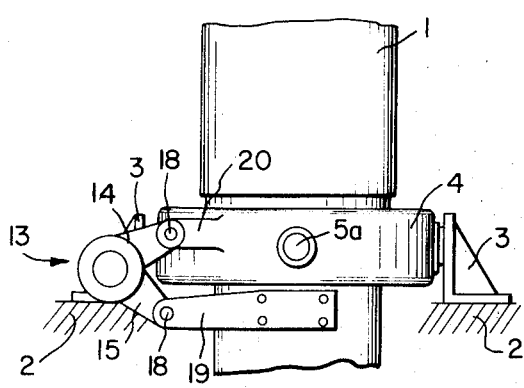
FIG. 3 is a side view as compared and with respect to FIG. 2.

FIG. 3 is a side view of FIG. 2. Here, the construction of the friction lining damper 13 and the attachment thereof has been shown in greater detail. The lower lever arm 15 is connected to a link joint 18 at the bracket or support 19. The support 19 in turn is secured to the rotor mast 1 by means of screws.

In the two-bladed rotor system present herein, there occur during the forward flight free transverse forces exerted upon the rotor mast which transmit vibrations upon the airframe at the frequency of the rotor blade angular positions. These vibrations have not only an undesirable and unpleasant effect upon the passengers present in the cockpit of the helicopter, but also exert in addition thereto extremely significant permanent stresses upon the connecting parts between the rotor and the airframe. The construction proposed by the present invention effectively eliminates these disadvantages. The rotor mast is universally movable within certain limits, for example an angle of 4°. By virtue of the use of the torsion spring rod 6, the rotor mast 1 is adapted to give way within the area and range about the x-axis and due to the provision of the set of leaf-type springs 9 it is adapted to give way within the area and range about the y-axis and may again be returned to the central position thereof. In order, however, that the vibrations transmitted to the system be attenuated as rapidly as possible, additional friction lining dampers are provided for. While the set of leaf-type springs has a good inherent damping with its individual spring leaves, it cannot suffice—because of the shortness of the set of leaf springs—to damp the vibrations rapidly enough.

This arrangement assures that the vibrations are kept away from the airframe. An overdimensioning of the airframe structure is not required when using such a rotor mast support or positioning.

It will be obvious to those skilled in the art that many modifications may be made within the scope of the present invention without departing from the spirit thereof, and the invention includes all such modifications.

What is claimed is:

1. A movable rotor mast support for helicopters adapted to be mounted between the rotor mast and the airframe comprising a universal joint including gimbal ring means and journal means, said gimbal ring means including lateral cantilever means having journal means therein, said latter journal means being extended to form a torsion spring rod, and rotation-preventing means connecting the end of the torsion spring rod with said cantilever means.

2. A rotor mast support according to claim 1 in which the rotation-preventing means comprises an involute tooth system.

3. A rotor mast support according to claim 1 in which the free end of the cantilever means is embedded in a transversely positioned set of leaf-type springs.

4. A rotor mast support according to claim 1 in which the cantilever means includes link joint means and vibration damping means acting thereon.

5. A rotor mast support according to claim 1 including vibration damping means connected to said gimbal ring means laterally of the longitudinal axis of the journals of said ring.

* * * * *